(12) United States Patent
Hubert

(10) Patent No.: US 7,574,382 B1
(45) Date of Patent: Aug. 11, 2009

(54) AUTOMATED DETECTION OF ANOMALOUS USER ACTIVITY ASSOCIATED WITH SPECIFIC ITEMS IN AN ELECTRONIC CATALOG

(75) Inventor: Zachary T. Hubert, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 569 days.

(21) Appl. No.: 10/910,457

(22) Filed: Aug. 3, 2004

(51) Int. Cl.
*G06F 17/30* (2006.01)

(52) U.S. Cl. ............................ 705/27; 705/1; 705/26

(58) Field of Classification Search .............. 705/26, 705/27
See application file for complete search history.

(56) References Cited

U.S. PATENT DOCUMENTS

| | | | |
|---|---|---|---|
| 5,659,593 | A | 8/1997 | Tzvieli |
| 6,032,145 | A * | 2/2000 | Beall et al. ........................ 707/5 |
| 6,549,919 | B2 * | 4/2003 | Lambert et al. ............... 707/203 |
| 6,714,918 | B2 * | 3/2004 | Hillmer et al. ................. 705/18 |
| 6,738,811 | B1 | 5/2004 | Liang |
| 6,944,599 | B1 * | 9/2005 | Vogel et al. ..................... 705/37 |
| 7,092,929 | B1 * | 8/2006 | Dvorak et al. .................. 706/12 |
| 7,251,589 | B1 | 7/2007 | Crowe et al. |
| 7,310,590 | B1 | 12/2007 | Bansal |
| 2001/0049690 | A1 | 12/2001 | McConnell et al. ........ 707/104.1 |
| 2002/0106709 | A1 | 8/2002 | Potts et al. |
| 2002/0161672 | A1 * | 10/2002 | Banks et al. .................... 705/27 |
| 2002/0169657 | A1 * | 11/2002 | Singh et al. .................... 705/10 |
| 2002/0178077 | A1 * | 11/2002 | Katz et al. ...................... 705/26 |
| 2003/0018928 | A1 | 1/2003 | James et al. |
| 2003/0033179 | A1 * | 2/2003 | Katz et al. ...................... 705/7 |
| 2003/0050859 | A1 * | 3/2003 | Rodriguez et al. ............. 705/27 |
| 2003/0055714 | A1 * | 3/2003 | Thompson et al. ............ 705/10 |
| 2003/0083956 | A1 * | 5/2003 | Freeny, Jr. ..................... 705/26 |
| 2003/0212590 | A1 * | 11/2003 | Klingler ......................... 705/10 |

(Continued)

FOREIGN PATENT DOCUMENTS

WO    WO 03/060642 A2    7/2003

OTHER PUBLICATIONS

Chang Yang et al., Efficient discovery of error-tolerant frequent itemsets in high dimensions., 2001, ACM Press.*

(Continued)

*Primary Examiner*—Jeffrey A. Smith
*Assistant Examiner*—Jason Dunham
(74) *Attorney, Agent, or Firm*—Knobbe, Martens, Olson & Bear, LLP

(57) ABSTRACT

An anomaly detection engine monitors network traffic to detect orders placed by users from an electronic catalog of items, aggregates data about the detected orders by time period, and analyzes the aggregated data to detect anomalies in activity levels associated with specific items in the catalog. To detect whether an anomaly exists in the activity data associated with a given item, a forecasting algorithm, such as an exponential smoothing algorithm, is used to generate an expected order volume for a current time period, and the expected order volume is compared to an actual order volume. Other criteria may also be taken into consideration. If an anomaly is detected, such as a sharp increase in the item's order volume, the anomaly detection engine generates an alert message to notify a catalog administrator, who may then determine whether the anomaly is attributable to an erroneous item description in the catalog.

60 Claims, 5 Drawing Sheets

U.S. PATENT DOCUMENTS

2003/0212618 A1    11/2003   Keyes et al.
2004/0088211 A1*    5/2004   Kakouros et al. ............. 705/10
2005/0033683 A1*    2/2005   Sacco et al. ................... 705/37
2005/0102175 A1*    5/2005   Dudat et al. .................. 705/10
2005/0102192 A1*    5/2005   Gerrits et al. ................. 705/26

OTHER PUBLICATIONS

Moira Cotlier. Avoiding costly online errors. Catalog Age. New Canaan, CT. Sep. 2000. vol. 17, Iss. 10.*

* cited by examiner

Mail From: Anomaly Detection Engine

File  Edit  View  Actions  Help

From: Anomaly Detection Engine
To: DVDs Product Line Manager
Subject: Anomalous User Activity Welcome to the Anomalous Activity report. The items listed below experienced unusually high order quantities during the last hour. Some clarifications:

*Expected* indicates the number of units of this item our forecasting algorithm predicted would be ordered during the last hour, based on prior trends.

*Actual* indicates the actual number of units of this item ordered during the last hour.

*Variation* is the ratio of *Actual* to *Expected*. The bigger the number, the further from expectation.

Chicago (Full Screen Edition), Item ID = B09RGBS, current price = $19.45
Expected = 22.03, Actual = 115, Variation = 5.22
Number of distinct users that ordered this item in the last hour: 109
View item's detail page   View graph of order activity over last week
Was this anomaly properly flagged for review?  [YES]  [NO]

Casablanca (Two-Disk Special Edition), Item ID = B09W0WM, current price = $20.24
Expected = 6.86, Actual = 73, Variation = 10.63
Number of distinct users that ordered this item in the last hour: 70
View item's detail page   View graph of order activity over last week
Was this anomaly properly flagged for review?  [YES]  [NO]

*FIG. 3*

AUTOMATED DETECTION OF ANOMALOUS USER ACTIVITY ASSOCIATED WITH SPECIFIC ITEMS IN AN ELECTRONIC CATALOG

BACKGROUND OF THE INVENTION

1. Field of the Invention

The present invention relates to computer-implemented processes for efficiently detecting anomalous user activity associated with specific items, such as items in an electronic catalog. The detected anomalies may, for example, be attributable to, and may be used to correct, errors in an electronic catalog.

2. Description of the Related Art

It has become common for businesses to set up web sites, and other types of interactive computer systems, to automate the process of accepting orders from users. Information about the items that can be ordered via such a system is typically disseminated to users via a browsable electronic catalog. While browsing the electronic catalog, users can typically select one or more items to purchase, rent, or otherwise acquire, and then place an order for these items. The ordered items may, for example, be shipped to the user from a distribution center, made available for local pick-up, or transmitted to the user electronically.

One problem with this type of system is that a large number of users can rely on, or take advantage of, a typographical or other error in the electronic catalog before the error is detected and corrected by authorized personnel. As a result, a single error, such as an error in the price of an item, can result in a significant loss of revenue to an online merchant. One potential solution to this problem is to set up a computer system that analyzes each order to evaluate whether it represents a significant departure from current trends. Due to the computational burden associated with this approach, however, it is not well suited for systems that process large numbers of orders (e.g., hundreds or thousands of orders per minute) placed from a catalog that includes a large number of items (e.g., millions of items).

SUMMARY OF THE INVENTION

The present invention comprises a system that detects anomalous user activity associated with specific items in an electronic catalog. The system may, for example, be implemented using a computer system, such a general-purpose computer, that passively monitors orders placed by users of the electronic catalog. The system is suitable for use in an electronic catalog system that, for example, receives thousands of orders per minute from a catalog that includes millions of items.

In one embodiment, the system includes a data repository that stores aggregated data about orders placed from an electronic catalog. The aggregated data may be arranged by time period, where each time period may, for example, have a duration of one hour. To analyze the aggregated data associated with a current time period (e.g., the last hour), an analyzer selects, from a set of items ordered during the current time period, a subset of items for which to conduct an anomaly analysis. The subset may, for example, be selected based on the quantity of each item ordered during the current time period and/or other criteria. By limiting the analysis to a selected subset of items, the analyzer controls the processing load associated with the anomaly detection process.

For each item in the subset, the analyzer uses order volume data from prior time periods to generate a forecasted or expected order volume for the current time period. An exponential smoothing algorithm may be used for this purpose. In one embodiment, the order volume for each item is specified in terms of the total quantity of the item ordered in the relevant time period, although other metrics reflective of the demand for the item, such as total number of distinct users that order the item, or total number of orders received for one or more units of the item, may additionally or alternatively be used. To determine whether an item's order activity or demand during the current time period is anomalous, the actual order volume associated with the item is compared to the item's forecasted order volume. Other criteria, such as the number of distinct users that ordered the item during the current time period, may also be taken into consideration.

If the analyzer determines that an anomaly exists in the order activity data for a given item, an alert message is generated and sent to an associated catalog administrator, such as an administrator responsible for a corresponding product category. The alert message may include a hyperlink to an associated catalog page to enable the administrator to efficiently evaluate whether the detected anomaly is attributable to an erroneous catalog description of the item. The alert message may also provide an option (e.g., a set of buttons or links) for the message recipient to provide feedback on whether the anomaly was properly detected. In embodiments that provide such a feedback option, the feedback may be used, on an item-by-item or other basis, to adaptively adjust the sensitivity of an anomaly detection algorithm used by the analyzer.

The invention may also be used where some or all of the orders are placed without the use of an electronic catalog. For example, the invention is applicable to systems that accept orders from recipients of a paper catalog that describes items that can be purchased.

One aspect of the invention is thus a system for detecting anomalous user activity associated with items in a catalog. The system comprises a data repository that stores aggregated data descriptive of orders placed by users from a catalog of items, with the aggregated data arranged by time period. A forecasting module analyzes item demand levels in prior time periods on an item-by-item basis, as indicated by the aggregated data, to predict demand levels for respective items in a current time period. The item demand levels may, for example, be measured and predicted in terms of total quantity of item ordered per time period. An anomaly detection module detects anomalies associated with specific items in the catalog, at least in part, by comparing the demand levels predicted by the forecasting module to corresponding observed demand levels. A reporting module generates alert messages to notify catalog administrators of items for which anomalies are detected by the anomaly detection module.

Neither this summary nor the following detailed description purports to define the invention. The invention is defined by the claims.

BRIEF DESCRIPTION OF THE DRAWINGS

FIG. 3 illustrates an example of an email message that may be sent to notify catalog administrators of detected anomalies.

DETAILED DESCRIPTION OF SPECIFIC EMBODIMENTS

Figure 1:
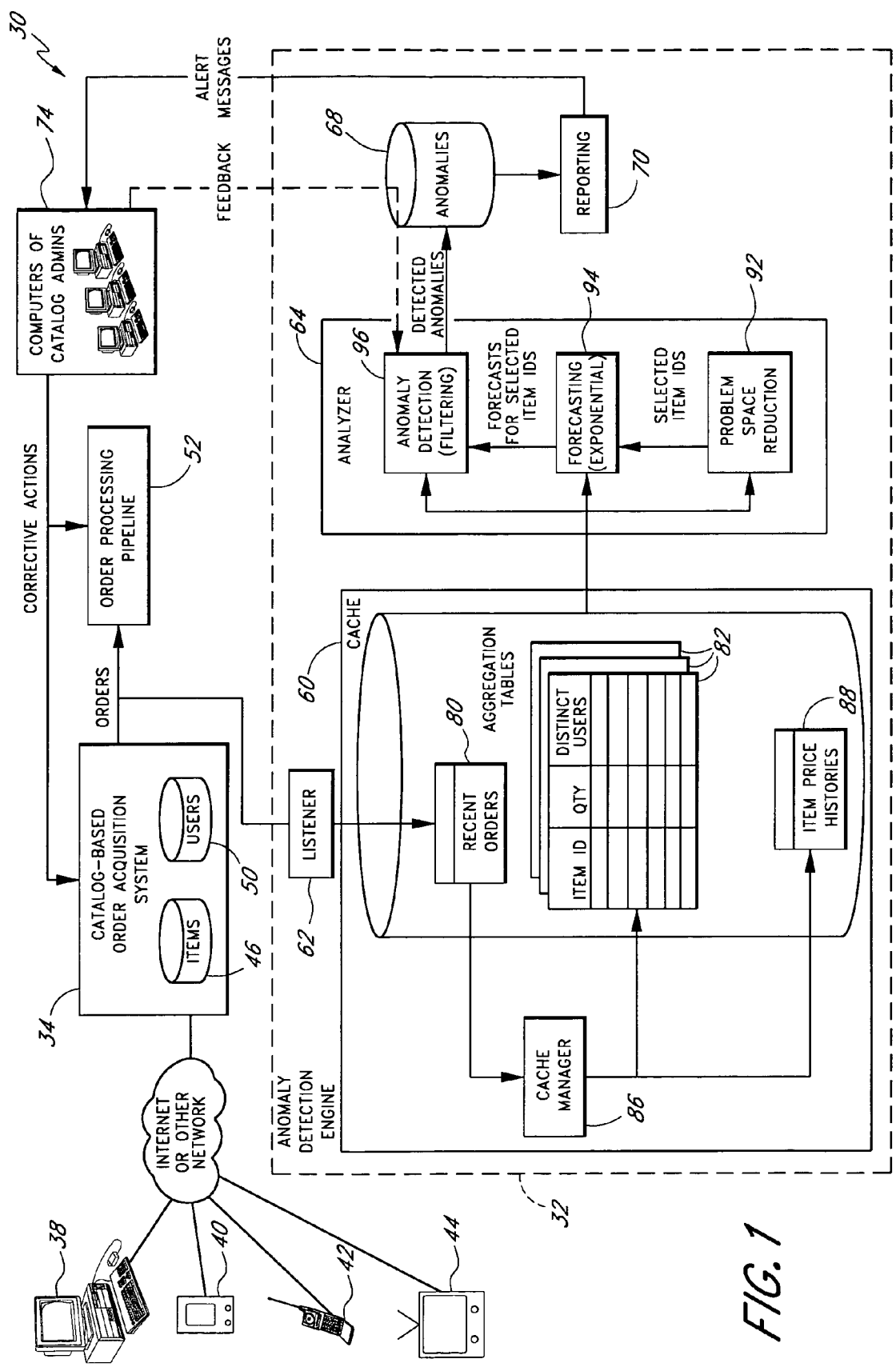
FIG. 1 illustrates an electronic catalog system that includes an anomaly detection engine according to one embodiment of the invention.

FIG. 1 illustrates an electronic catalog system 30 that includes an anomaly detection engine 32 according to one embodiment of the invention. The electronic catalog system 30 includes a catalog-based order acquisition system 34 that is accessible via a computer network, such as the Internet. The order acquisition system 34 provides functionality for users to browse and order items from an electronic catalog of items using one or more different types of devices, such as personal computers 38, Personal Digital Assistants (PDAs) 40, telephones 42, and/or interactive televisions 44. The order acquisition system 34 may, for example, be in the form of a World Wide Web site that serves web pages in accordance with the Hypertext Transfer Protocol (HTTP), an interactive television system, a telephone-based system that supports browsing by voice (e.g., using VoiceXML pages), an online services network that uses proprietary client software, or any combination thereof.

As depicted in FIG. 1, the order acquisition system 34 includes an items database 46 that stores information about items that may be ordered (for purchase, rental, etc.) from the electronic catalog. The items may, for example, include physical products that are shipped to users, digital works that are transferred to users electronically, hotel and car rental packages, vacation packages, airline tickets, tickets to events, magazine subscriptions, computer programs, gift carts, stocks and bonds traded on an exchange, and/or other types of items that may be ordered online. The information stored for each item typically includes the item's price and availability and a textual description of the item, and may also include a photo of the item, customer ratings and reviews, and other types of information commonly found in an electronic catalog. In a commercial implementation of the system, many tens of millions of different items falling within thousands of different item categories are represented in the items database 46 and are available for purchase via the electronic catalog. Although depicted as a single database, the items database 46 may actually include multiple distinct databases.

Some or all of the information stored in the items database 46 for a given item is disseminated to users as part of the electronic catalog, such as on item detail pages of a web site. Updates to the catalog are made by updating the items database 46. The updates may include item additions and deletions, and changes to various item attributes (price, availability, description, photo, average customer review, etc.). The updates may come from various sources, such as catalog administrators, suppliers, merchants that sell items via the electronic catalog, or an inventory management system.

Errors in the item information supplied by any of the sources of item information may result in an error in the catalog. Examples of the types of errors that can occur include erroneous price information, erroneous availability information (e.g., a not-yet-released item is listed as being available), and erroneous descriptions of product features (e.g., a 2-megapixel camera is listed as a 4-megapixel camera). As discussed below, the anomaly detection engine 32 rapidly identifies anomalous user behavior suggestive of these and other types of catalog errors. The anomaly detection engine 32 may also be used to detect fraudulent user activity.

The order acquisition system 34 also includes a users database 50 that stores information about users that have registered with the system 30. The information stored for a given user may include, for example, a username and password, shipping information, payment information, and a history of orders placed by the user.

As illustrated in FIG. 1, orders placed by users via the order acquisition system 34 are passed over a computer network to an order processing pipeline 52. A given order may include multiple items, and may include multiple units of a given item. In a commercial implementation of the system 30, many hundreds to thousands of orders are typically received and processed per minute, and many tens to hundreds of thousands of different items are typically ordered within a given one-hour time period.

The order processing pipeline 52 is responsible for collecting payments from users, such as by charging a user's credit card upon shipment of a set of ordered items. In the case of physical products, the order processing pipeline 52 may also select one or more distribution centers from which to ship the ordered items, and may provide associated messaging and order tracking for purposes of order fulfillment. In some embodiments, some or all of the orders may be fulfilled by a business entity other than the entity that operates the electronic catalog system 30. For instance, the electronic catalog system 30 may acquire orders and collect payments for many different merchants.

The primary components of the anomaly detection engine 32, in the illustrated embodiment, are a cache 60 that stores and aggregates information about recently placed orders, a listener 62 that populates the cache 60 as orders are placed by users, and an analyzer 64 that analyzes aggregated data stored in the cache to detect anomalous user behavior associated with specific catalog items. The anomaly detection engine 32 also includes an anomalies database 68 that stores information about detected anomalies. In addition, the anomaly detection engine 32 includes a reporting component 70 that sends alert messages to catalog administrators (represented by block 74, which depicts the computers of the administrators). The reporting component 70 may also provide functionality for administrators to interactively generate charts and reports of information stored in the anomalies database 68. The cache 60 and the anomalies database 68 may be implemented using any type of data repository.

In one embodiment, the anomaly detection engine 32 is implemented entirely within software executed by a single, general-purpose computer. Because the anomaly detection engine 32 uses highly efficient data processing algorithms, this single computer is capable of detecting anomalies substantially in real time with a sustained order rate of over $10^3$ orders per minute and a catalog size of over $10^8$ items. Although a single computer may be used, the anomaly detection engine 32 may alternatively be implemented using two or more computers.

The operation of the anomaly detection engine 32 will now be described with reference to FIG. 1. A more detailed description of the analysis steps performed by the anomaly detection engine 32 will subsequently be described with reference to FIG. 4.

As depicted in FIG. 1, the cache 60 includes two primary types of database tables: a "recent orders" table 80 and a set of aggregation tables 82. The recent orders table 80 stores detailed information about orders recently placed by users. This table 80 is populated by the listener 62, which passively monitors network traffic to detect transmissions by the order acquisition system 34 of messages describing new orders. Information about recent orders may alternatively be obtained from another source, such as by periodically querying a database used for order fulfillment. In one embodiment, the recent orders table 80 only stores information about orders placed by users over the preceding hour. The information stored in the table 80 for each order may include the item ID, price, and quantity of each ordered item, and an identifier of the user that placed the order.

Each aggregation table 82 stores aggregated information about orders placed during a respective, one-hour time period, such that the orders placed during a single day are effectively divided among twenty-four one-hour "buckets." Aggregation tables that represent smaller or larger time periods may alternatively be used. For example, time periods falling in the range of one minute to six hours, and more typically in the range of twenty minutes to three hours, may be used. Although multiple aggregation tables 82 are shown in FIG. 1 for purposes of illustration, a single aggregation table may be used to store all of the aggregated data. For example, in one embodiment, a single aggregation table 82 is used to store a rolling month's worth of data, which is aggregated using one-hour time periods.

Each aggregation table 82 includes one entry (row) for each item ordered during the corresponding constituent time period. As illustrated, each such entry contains the ID of the item, the total quantity of that item ordered over the corresponding one-hour time period, and the number of distinct users that ordered the item during that time period. In one embodiment, aggregation tables 82 are maintained in the cache 60 for user activity occurring over the preceding thirty days. As depicted in FIG. 1, a cache manager 86 periodically generates a new aggregation table 82 from data stored in the recent orders table 80. The cache manager 86 may also be responsible for purging aged data from the cache 60.

In some embodiments of the invention, the analyzer 64 takes item prices into consideration for purposes of detecting anomalies. In these embodiments, the cache manager 86 may also use the data read from the recent orders table to maintain an item price histories table 88. The item price histories table 88 may, for example, store a history of up to the last X (e.g., 3) price changes detected for each item in the catalog. Information about recent item prices, if used, may alternatively be obtained from another source.

The analyzer 64 may be invoked each time a new aggregation table 82 is generated in order to search for anomalies in order activity data recorded therein. As illustrated in FIG. 1, the analyzer 64 includes three functional blocks or modules, each of which may be implemented in software: a problem space reduction module 92, a forecasting module 94, and an anomaly detection or "filtering" module 96. Each of these modules 92-96 corresponds to a respective phase of the analysis process.

The problem space reduction module 92 is responsible for selecting, from the set of items ordered during the current time period, a relatively small subset of items for which to conduct a forecasting and anomaly detection analysis. The purpose of the problem space reduction phase is to reduce the processing burden associated with the forecasting and anomaly detection phases to an acceptable level, such as a level which permits the analysis of a one-hour bucket to be completed in less than one hour. In one embodiment, the problem space reduction module 92 selects a total of N items from one or both of the following groups, where N is a selected integer such as 200 or 500:

1. The items ordered the most frequently during the current time period, or during some other time period such as the last three hours; and
2. The items for which (total quantity ordered during current time period)×(recent item price) is the highest.

Group 1 is based primarily on the assumption that the items for which the most serious catalog errors exist, such as severe pricing errors that are favorable to customers, will likely experience the highest levels of order activity. Group 2, on the other hand, focuses on relatively high cost, low volume items, since catalog errors associated with these items can be very costly even at relatively low volumes. Because the current price in the catalog may be erroneous, a recent item price is used in the calculation for group 2. The recent item price may be obtained from the item price histories table 88 or some other source of price information.

In embodiments in which order volumes are sufficiently low, and/or computing resources are sufficiently high, the anomaly analysis may be performed in connection with all items ordered during the current time period. In such embodiments, the problem space reduction module 92 may be omitted or disabled.

As depicted in FIG. 1, the IDs of the items selected by the problem space reduction module 92 are passed to the forecasting module 94. For each selected item, the forecasting module 94 uses the data stored in the aggregation tables 82 from prior time periods to forecast or predict the total order quantity for the current time period. (As described below, the forecasting module 94 may alternatively predict the number of distinct users to order the item during the current time period.) The forecasted or predicted item quantities for the current time period may be generated either before or after the current time period has ended. Thus, the terms "forecast" and "predict," as used herein, are not intended to imply that the forecasted quantities are necessarily generated before the corresponding actual quantities are known. Whether generated before or after the fact, a "forecast" or "prediction" of what should ordinarily happen (or have happened) can be compared to what actually does (or did) happen.

In one embodiment, the forecasting module 94 uses an exponential smoothing algorithm, such as a single, double or triple exponential smoothing algorithm, to generate the forecasted item quantities. Exponential smoothing algorithms give exponentially decreasing weight to data values from progressively earlier time periods. Thus, for example, to predict an item's order quantity for the current time period, or "t," the greatest weight would be given to the item's quantity value from the immediately preceding time period, t−1, and exponentially decreasing weight would be given to the quantity values from time periods t−2, t−3, and so on. Although an exponential smoothing algorithm is used in the illustrated embodiment, other types of time series forecasting algorithms may be used, such as single and double moving average, Holt-Winters, and multiple linear regression algorithms.

Figure 2:
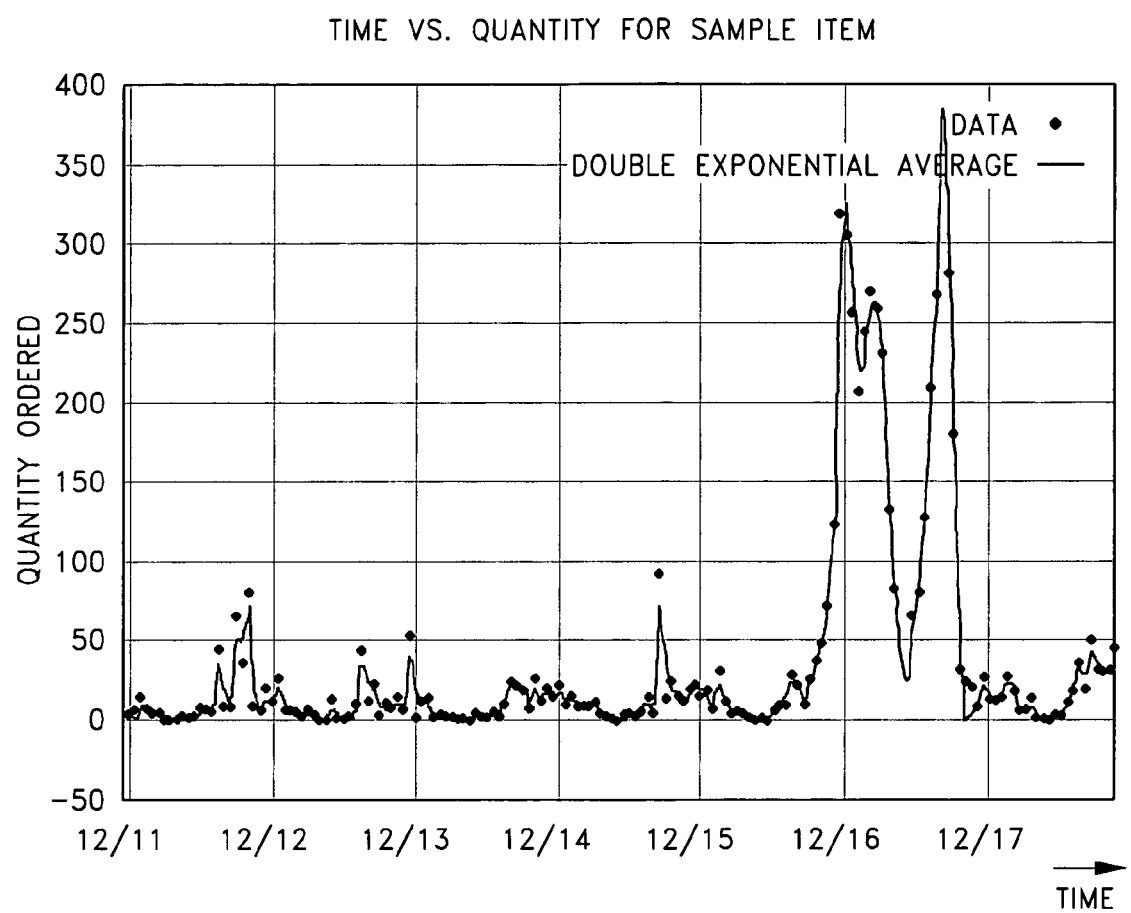
FIG. 2 illustrates a graph that depicts an anomaly in the order activity associated with a particular item in a catalog.

FIG. 2 illustrates an example set of quantity data values collected over a one week period of time for a particular item. Each data value represents the item's total order quantity for a corresponding one-hour period of time. In this example, a sharp increase in the hourly order quantity occurred just before the date 12/16, indicating a possible catalog error. When aberrations of this type occur, the actual quantity will typically deviate significantly from the forecasted quantity. In this particular example, the item at issue was a gift card, and the anomalous user activity was the result of a catalog error that allowed users to purchase the relevant item at a significant discount. In some cases, anomalies of the type shown in FIG. 2 are the result of other problems, such as fraudulent user activity; for example, an unauthorized distributor of an item may be attempting to purchase a large number of units to re-sell.

Referring again to FIG. 1, the forecasted quantities for the N selected items are passed to the anomaly detection module 96, which determines which of these items, if any, experienced anomalous order activity. The anomaly detection module 96 evaluates whether anomalies exist, at least in part, by comparing the forecasted quantity values to the observed or actual quantity values. (In embodiments in which the distinct number of users to purchase each item is forecasted, the anomaly detection module may alternatively compare the forecasted numbers of users to the actual numbers of users.) For example, an anomaly may be deemed to exist for a given item if its actual quantity for the current time period exceeds the forecasted quantity by more than a selected threshold, such as 20%. (Aberrations in which the actual quantity is less than the predicted quantity may be ignored.) One or more additional types of data may also be taken into consideration in determining whether to treat the current activity as an anomaly, such as (a) the number of distinct users that ordered the item during the current period, (b) the price of the item, and/or (c) the quantity ordered during the current period (see examples below).

In one embodiment, the anomaly detection module 96 uses a set of one or more thresholds to determine, for each selected item, whether an anomaly exists. By way of example and not limitation, an anomaly may be deemed to exist if and only if the following three conditions are met:

1. actual quantity/forecasted quantity>1.2;
2. actual quantity>5; and
3. actual quantity×recent price>$1000

The second of these three conditions filters out those items for which the low volume of orders is likely to produce statistically inaccurate forecasting results. The third condition filters out those items for which the potential monetary loss over the current time period falls below a selected threshold. The actual threshold values used for these and other conditions may vary by type or category of product. In addition, different thresholds may be used based on the time of day (e.g., greater variations may be permitted during peak periods).

In another embodiment, a scoring algorithm is used to generate a respective score for each of the N selected catalog items. By way of example and not limitation, a score may be generated for each item according to the following equation:

$$\text{score}=10\times(\text{actual quantity/forecasted quantity})+10\times(\text{no. distinct users who order the item})+100\times(\text{avg. order size}).$$

Equation 1

The score may be compared to one or more thresholds to evaluate whether, or the extent to which, the associated user activity is anomalous. For example, scores in the range of 0 to 500 may be treated as normal, scores in the range of over 500 to 1000 may be treated as revealing a medium risk anomaly, and scores above 1000 may be treated as revealing a high risk anomaly.

As discussed below, the anomaly detection module 96 may also use a relevance feedback algorithm to adapt to the feedback provided by human operators.

As further illustrated in FIG. 1, the anomaly detection module 96 records information about any anomalies it detects in the anomalies database 68, which may be any type of data repository. The information stored in this database 68 for a given anomaly may specify, for example, the ID of the associated item, the one-hour time period in which the anomaly occurred, the actual and forecasted quantity values for that time period, and if a scoring algorithm was used, a score or severity level associated with the anomaly. The actual quantity values from a set of prior one-hour time periods may also be stored to permit subsequent generation and display of a graph of the type shown in FIG. 2.

As depicted in FIG. 1, the reporting module 70 generates alert messages to notify catalog administrators 74 of some or all of the detected anomalies. The alert messages may be sent by email, pager, instant messaging, and/or other communications methods. One example of an email alert message is illustrated in FIG. 3, which is discussed below. Typically, different catalog administrators are responsible for different categories or lines of products. Accordingly, when an anomaly is detected, the reporting module 70 may use a directory (not shown) to look up and notify the specific administrator(s) associated with the corresponding item. The identities of the administrators that receive a given alert may also be dependent upon the severity of the anomaly.

Upon receiving an alert message, the catalog administrator can determine whether an error exists in the item's catalog description, such as by viewing the item's detail page. If an error is found, the administrator can take an appropriate corrective action, such as correcting the error in the catalog, and possibly blocking pending orders for the relevant item from being fulfilled. (Assuming one-hour time intervals are used, the anomaly is typically reported within one hour of its occurrence, allowing pending orders placed at the time of the anomaly to be blocked.) In some embodiments, the task of checking for and correcting the associated catalog error may be partially or fully automated.

FIG. 3 illustrates one example of an email alert message that may be automatically generated and sent by the reporting component 70. The text of the alert message identifies two items for which anomalies were detected within the current one-hour time period. For each such item, the alert message indicates, for the current time period, the actual and forecasted (expected) quantities ordered and the number of distinct users that ordered the item. In addition, the alert message includes a hyperlink to the corresponding item detail page in the catalog, and a hyperlink for viewing a graph of the type shown in FIG. 2 (which may be generated and displayed by the reporting component 70).

Figure 5:
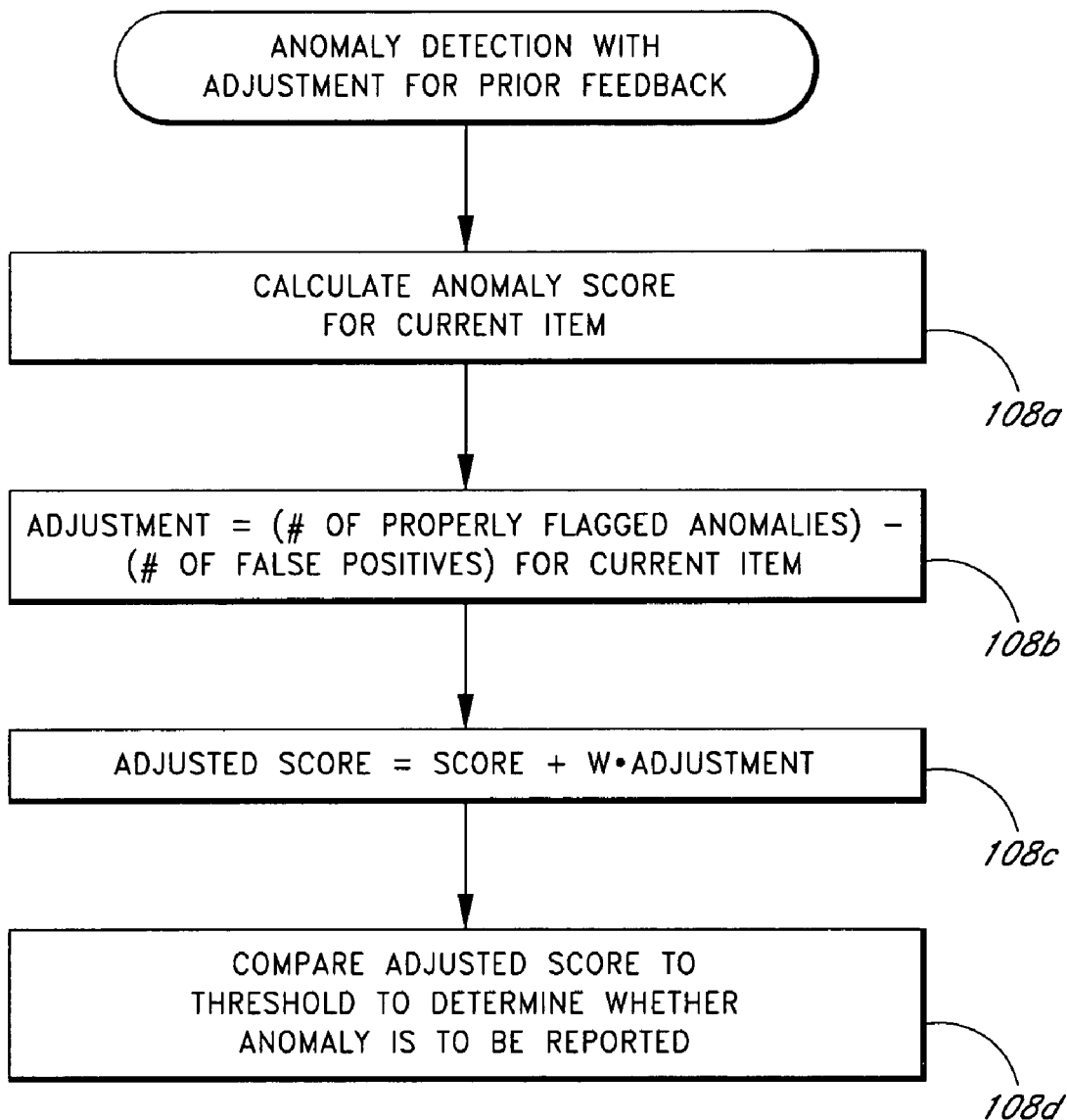
FIG. 5 illustrates one example of how relevance feedback may be taken into consideration to evaluate potential anomalies.

In the example shown in FIG. 3, the alert message also includes buttons for the message recipient to provide feedback on whether each anomaly was properly detected and flagged for human review. As depicted by the dashed "feedback" line in FIG. 1, the feedback responses may be recorded in the anomalies database 68 or some other data repository, and may be used by the anomaly detection module 96 to adaptively adjust the sensitivity of the anomaly detection algorithm on an item-by-item basis. FIG. 5, which is discussed below, illustrates one example of how past administrator feedback may be taken into consideration in determining whether an anomaly should be reported. If a catalog administrator fails to respond to an alert message within a selected time period, the reporting module 70 may send the alert message to one or more additional administrators.

Although FIG. 3 illustrates the use of two feedback options ("yes" and "no"), a greater number of options may be provided. For example, message recipients may be prompted to rate the severity of the reported anomaly on a specified scale, such as a scale of 1 to 5 to 10.

Figure 4:
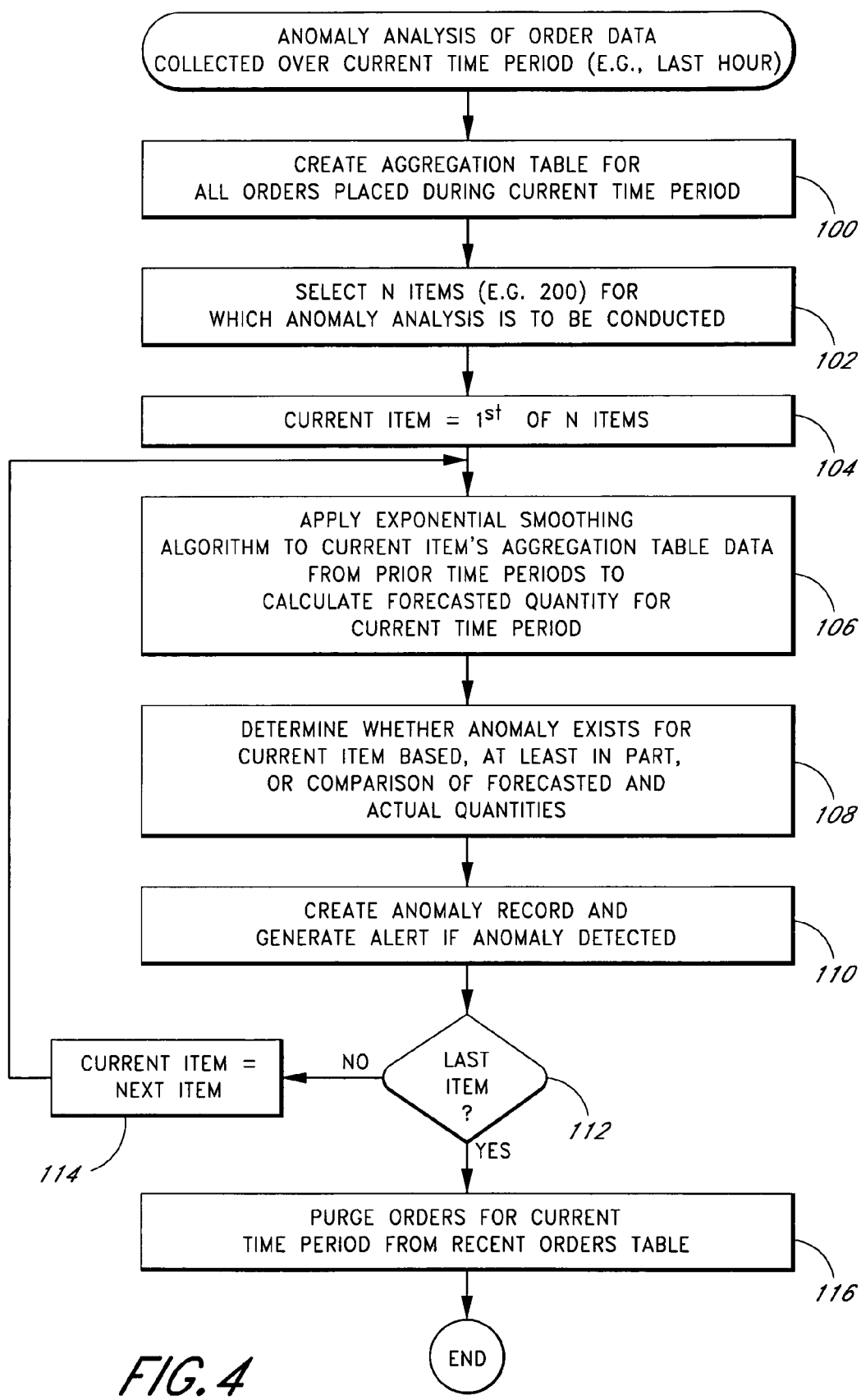
FIG. 4 illustrates a sequence of steps performed by the anomaly detection engine to analyze order data collected over a period of time.

FIG. 4 illustrates an example sequence of steps that may be performed by the anomaly detection engine 32 to process and analyze the data collected during the current time period (e.g., the preceding one-hour period). This sequence of steps may be embodied within a computer program that is executed periodically, such as once per hour. The functions performed by this sequence of steps represent some or all of the functionality of the following components shown in FIG. 1: the cache manager 86, the problem space reduction module 92, the forecasting module 94, the anomaly detection module 96, and the reporting module 70. As will be apparent, the ordering of steps shown in FIG. 4 may be varied.

In step 100 of FIG. 4, the order data collected in the recent orders table 80 over the current time period is aggregated and summarized to create a corresponding aggregation table 82. During this process, many entries (orders) in the recent orders table 80 may be condensed into a single table entry of the aggregation table 82. For example, if thirty distinct users placed orders for a total of forty units of item 1234, a single table entry would be created with the values item ID=1234, quantity=40, and distinct users=30.

In step 102, which corresponds to the problem space reduction block in FIG. 1, N of the items ordered during the current time period are selected for further analysis. Typically, N represents a small percentage, such as 0.01% to 2%, of the items ordered during the current time period. In step 104, one of the N items is selected as the current item for analysis.

In step 106, an exponential smoothing algorithm is applied to the current item's aggregation table data (quantity values) from prior time periods to calculate the forecasted quantity for the current time period. This step may optionally be performed before the end of the current time period because it relies solely on data from prior time periods. For example, before the end of the current time period, forecasted quantities may be calculated for those items that, based on the activity that has already occurred during the current time period, are predicted to be included in the set of N items. Forecasts for any additional items that end up being selected in step 102 can then be generated at the end of the current time period.

If a double exponential smoothing algorithm is used in step 106, the forecast may be made using the following equations, where $F_{t+1}$ is the forecast for time period t+1, $y_t$ represents the actual observation for time period t, and $\alpha$ and $\gamma$ are smoothing constants between 0 and 1.

$$F_{t+1} = S_t + b_t \qquad \text{Equation 2}$$

$$S_t = \alpha y_t + (1-\alpha)(S_{t-1} + b_{t-1}) \qquad \text{Equation 3}$$

$$b_t = \gamma(S_t - S_{t-1}) + (1-\gamma)b_{t-1} \qquad \text{Equation 4}$$

In one embodiment, a value of 0.8 is used for each of $\alpha$ and $\gamma$. In another embodiment, the forecasting module 94 iteratively selects, for each item, an $\alpha$ and $\gamma$ that produces a "best match" between the second exponential smoothing curve and the associated time series of observed quantity values; the $\alpha$ and $\gamma$ values that produce the best match (lowest error) are then used to generate the forecasted quantity for that item.

In step 108, the forecasted and actual quantity values, and optionally other types of data, are used to evaluate whether an anomaly exists in the current item's order data. This evaluation may be performed using one of the methods described above or another appropriate method, and may optionally take into consideration prior feedback provided by catalog administrators. If an anomaly is detected in step 108, it is recorded in the anomalies database 68 as depicted in step 110, and an alert message is generated and sent to a catalog administrator.

As will be apparent, steps 106 (forecasting) and 108 (anomaly detection) may, in practice, be combined. For example, the two steps may be embodied within a single formula or function that generates a yes/no response based on the item's actual quantity values for the current and prior time periods.

As mentioned above, one possible variation to the illustrated embodiment is to forecast and compare the number of distinct users that order the item, rather than (or in addition to) forecasting and comparing the total item quantity. Specifically, in step 106, the number of distinct users that acquired the current item in prior time periods can be used to predict the number of distinct users for the current period. This number can then be compared, in step 108, to the actual number of distinct users that acquired the item during the current time period. With this variation, all of the components depicted in FIG. 1, and all of the steps shown in FIG. 4, may otherwise be substantially the same as described herein. Other measures of the demand or order volume for the particular item may also be used, such as total dollar amount spent on the item during the relevant time period, or the total number of orders received that include one or more units of the item. Thus, steps 106 and 108 may more generally be performed so as to predict the "demand" for the current item and time period, and to compare this prediction to the actual or observed demand, where "demand" may be predicted and measured in terms of the total quantity (number of units) of the item ordered, the total number of distinct users who order the item, the total number of orders received that include one or more units of the item, the total dollar amount spent by users on the item, and/or other criteria. Other types of events reflective of item demand levels, such as the addition of an item to an online shopping cart or wish list, may also be taken into consideration.

As depicted by the loop that includes step 114, steps 106-108 are repeated for each additional item in the set of N items until the last item is reached in step 112. The order data stored in the recent items table 80 for the current time period may then be purged, as shown in step 116.

FIG. 5 illustrates one example of how administrator feedback may be taken into consideration in block 108 of FIG. 4. In this example, it is assumed that a score is generated for the current item, and that this score is compared to a threshold to determine whether an anomaly exists. In step 108A, the score is generated for the current item, optionally using equation 1 above. In step 108B, prior administrator feedback is used to calculate an adjustment for the current item. The adjustment may be calculated by subtracting the number of false positives reported for this item from the number of properly flagged anomalies. In step 108C, the adjustment is multiplied by a weighting factor W, and the result is added to the score to generate an adjusted score. Thus, if the number of properly flagged anomalies exceeds the number of false positives, the score will be increased; and if the number of properly flagged anomalies is less than the number of false positives, the score will be decreased. Finally, in step 108D, the adjusted score is compared to a predefined score threshold (or possibly multiple score thresholds) to determine whether an anomaly exists.

Numerous variations to the approach shown in FIG. 5 are possible. For example, when administrator feedback is provided in connection with a reported anomaly, the feedback may also be taken into consideration, to a lesser extent, in subsequently evaluating order anomalies for other items in the same item category. Further, rather than adjusting a score, one or more thresholds may be adjusted in response to the feedback.

As will be appreciated by the foregoing, the disclosed architecture can easily be scaled by adding additional computers. For example, assuming a single computer is initially used to implement the anomaly detection engine 32, the number of items for which an anomaly analysis is conducted each time period can be approximately doubled by adding a second computer. This second computer can be a replicated version of the first computer (i.e., can include all of the components and modules shown in block 62 of FIG. 1), but programmed to select a different set items N items for which to conduct the analysis. Thus, for example, if the first computer selects the N items having the highest quantities in the current period (see step 102 of FIG. 4), the second computer can be configured to select the next N items with the highest quantities. Numerous other approaches for dividing the anomaly engine's functionality between computers are also possible. In addition, a single anomaly engine 32 may be configured to monitor orders from multiple, distinct web sites and electronic catalogs.

The invention may also be applied where some or all of the orders are placed without the use of an electronic catalog. For example, the invention is applicable to systems that accept orders from recipients of a paper catalog that describes items that can be ordered. To select an item to order in such a system, the user may, for example, scan-in a corresponding bar code label from the paper catalog using a PDA or a digital pen, or may specify a product identifier using a computer keyboard, a telephone keypad, or automated voice recognition. The components and algorithms used in such paper-catalog-based embodiments may be substantially the same as those shown in the drawings and described above. The invention may also be used in systems that accept orders placed from electronic catalogs that are distributed by CD, DVD, disk, tape, or other types of information storage medium.

Although this invention has been described in terms of certain specific embodiments and applications, other embodiments and applications that are apparent to those of ordinary skill in the art, including embodiments that do not provide all of the features and advantages set forth herein, are also within the scope of this invention. Accordingly, the scope of the present invention is defined only by the appended claims.

What is claimed is:

1. A computer-implemented method of detecting anomalous user activity associated with items in an electronic catalog, the method comprising:

storing order data descriptive of orders placed by users for items from an electronic catalog of items;

identifying, from the order data, a set of items ordered by users from the electronic catalog during a current time period;

via execution of instructions by a computing device, selecting, from the set of items, a subset of items for which to conduct an anomaly analysis, so as to control a computational processing load associated with the anomaly analysis;

for each item in the subset, (a) calculating a forecasted demand for the respective item in the current time period based on observed demand for the respective item in prior time periods, as reflected by said order data, and (b) evaluating whether order activity for the respective item is anomalous based on at least the forecasted demand for the respective item and an observed demand for the respective item in the current time period; and in response to detection of anomalous order activity in (b), generating an alert message that identifies an item associated with the anomalous order activity.

2. The method of claim 1, wherein calculating a forecasted demand comprises calculating a forecasted quantity of the respective item ordered during the current time period.

3. The method of claim 1, wherein calculating a forecasted demand comprises calculating a forecasted number of distinct users that order the item during the current time period.

4. The method of claim 1, wherein storing order data descriptive of orders comprises storing aggregated order data for each of a plurality items and time periods, and the method comprises using the aggregated order data to calculate the forecasted demand for each item in the subset.

5. The method of claim 1, wherein the forecasted demand for each item is calculated using an exponential smoothing algorithm.

6. The method of claim 5, wherein the exponential smoothing algorithm is a double exponential smoothing algorithm.

7. The method of claim 1, wherein the forecasted demand for each item is calculated using at least one of (a) a moving average algorithm, (b) a Holt-Winters algorithm, and (c) a multiple linear regression algorithm.

8. The method of claim 1, wherein the subset of items is selected based, at least in part, on quantities of items ordered during the current time period.

9. The method of claim 8, wherein the subset of items is selected based additionally on item price data.

10. The method of claim 1, wherein the forecasted demand for at least some of the items in the subset is calculated in (a) during the current time period.

11. The method of claim 1, wherein the forecasted demand for at least some of the items in the subset is calculated in (a) after the current time period.

12. The method of claim 1, wherein the method is performed by a single, general purpose computer that monitors order activity associated with the electronic catalog.

13. The method of claim 1, wherein the current time period has a duration falling in the range of one minute to six hours.

14. The method of claim 1, wherein the alert message provides an option for a recipient thereof to provide feedback reflective of whether the anomalous order activity was properly detected.

15. The method of claim 1, wherein evaluating whether the order activity for the respective item is anomalous comprises taking into consideration prior human feedback provided in response to at least one prior alert message generated in association with the respective item.

16. The method of claim 1, wherein evaluating whether the order activity for the respective item is anomalous additionally comprises taking into consideration a number of distinct users that ordered the respective item during the current time period.

17. The method of claim 1, wherein the method comprises using a single formula that combines both (a) and (b), and in response to detection of anomalous order activity, storing information about the anomalous order activity in a data repository.

18. The method of claim 1, wherein the subset of items comprises physical products that are shipped to users.

19. The method of claim 1, wherein selecting the subset of items comprises using order data to select items ordered the most frequently during a selected time period.

20. The method of claim 1, wherein selecting the subset of items comprises taking into consideration, for each item in said set of items, a total quantity of the item ordered during the current time period and a price of the item.

21. The method of claim 1, wherein the subset of items is selected so that the anomaly analysis for the items in the subset is performed in less than the duration of the current time period, said duration being no more than three hours.

22. The method of claim 1, wherein the subset of items is selected so that the anomaly analysis for the items in the subset is performed prior to fulfillment of orders placed for the items during the current time period.

23. The method of claim 1, wherein the anomaly analysis is performed substantially in real time.

24. The method of claim 1, wherein the method comprises detecting the anomalous order activity substantially in real time with a sustained order rate of over $10^3$ orders per minute and a catalog size of over $10^8$ items.

25. The method of claim 1, wherein evaluating whether the order activity for the respective item is anomalous comprises comparing the forecasted demand for the respective item to the observed demand for the respective item.

26. The method of claim 1, wherein each of said time periods has a duration of no more than three hours.

27. The method of claim 1, wherein the method is performed periodically by a computer system that comprises one or more computing devices.

28. The method of claim 1, further comprising, in response to the alert message, assessing whether the anomalous order activity is a result of an erroneous item description in the electronic catalog.

29. The method of claim 1, wherein the method in its entirety is automatically performed by a machine that comprises one or more computing devices.

30. A computer-implemented method of detecting anomalous user activity associated with items in an electronic catalog, the method comprising:

storing order data descriptive of orders placed by users for items from an electronic catalog of items;

identifying, from the order data, a set of items ordered by users from the electronic catalog during a current time period;

via execution of instructions by a computing system, selecting, from the set of items, a subset of items for which to conduct an anomaly analysis, so as to control a computational processing load associated with the anomaly analysis;

for each item in the subset, (a) calculating a forecasted demand for the respective item in the current time period based on observed demand for the respective item in prior time periods, as reflected by said order data, and (b) evaluating whether order activity for the respective item is anomalous based on at least the forecasted demand for the respective item and an observed demand for the respective item in the current time period; and in response to detection of anomalous order activity in (b), generating an alert message that identifies an item associated with the anomalous order activity, wherein the alert message comprises a hyperlink to a catalog page that describes the item for which the anomalous order activity was detected, such that a recipient of the alert message can access the catalog page to evaluate whether the anomalous order activity resulted from an error in the catalog.

31. The method of claim 30, wherein the method in its entirety is automatically performed by a machine that comprises one or more computing devices.

32. A computer-readable medium having stored thereon a set of program modules that, when executed by a computer, cause the computer to perform a method of detecting anomalous user activity associated with items in an electronic catalog, the method comprising:

storing order data descriptive of orders placed by users for items from an electronic catalog of items;

identifying, from the order data, a set of items ordered by users from the electronic catalog during a current time period;

selecting, from the set of items, a subset of items for which to conduct an anomaly analysis, so as to control a computational processing load associated with the anomaly analysis;

for each item in the subset, (a) calculating a forecasted demand for the respective item in the current time period based on observed demand for the respective item in prior time periods, as reflected by said order data, and (b) evaluating whether order activity for the respective item is anomalous based on at least the forecasted demand for the respective item and an observed demand for the respective item in the current time period; and in response to detection of anomalous order activity in (b), generating an alert message that identifies an item associated with the anomalous order activity.

33. A system for detecting anomalous user activity associated with items in a catalog, comprising:

a data repository that stores aggregated data descriptive of orders placed by users from a catalog of items, said aggregated data arranged by time period;

a forecasting module that analyzes demand levels in prior time periods on an item-by-item basis for at least some items identified as ordered by users during a current time period, as indicated by the aggregated data, to predict demand levels for respective items in the current time period;

an anomaly detection module that detects anomalies associated with specific items in the catalog at least by comparing the demand levels predicted by the forecasting module to corresponding observed demand levels;

a reporting module that generates alert messages to notify catalog administrators of items for which anomalies are detected by the anomaly detection module; and computer hardware that executes the forecasting module, the anomaly detection module, and the reporting module, the computer hardware comprising one or more computers.

34. The system of claim 33, wherein the forecasting module predicts an item's demand level in terms of at least one of the following: (a) total quantity of the item ordered in a time period, (b) total number of distinct users who order the item in a time period, (c) total number of orders received in a time period that include one or more units of the item, (d) total dollar amount spent by users on the item in a time period.

35. The system of claim 33, wherein the forecasting module predicts an item's demand level in the current time period by predicting a total quantity of the item ordered during the current time period.

36. The system of claim 33, further comprising a listener that passively monitors network traffic to detect new orders, and which stores information about the new orders in the data repository.

37. The system of claim 33, further comprising a problem space reduction module that selects, from the items identified as ordered during the current time period, a subset of items for which to conduct an anomaly analysis, so as to reduce a processing load associated with execution of the forecasting and anomaly detection modules.

38. The system of claim 33, wherein the anomaly detection module implements a relevance feedback algorithm to adapt to human feedback provided in association with detected anomalies.

39. The system of claim 33, wherein the forecasting module calculates the forecasted demand levels using an exponential smoothing algorithm.

40. The system of claim 39, wherein the exponential smoothing algorithm is a double exponential smoothing algorithm.

41. The system of claim 33, wherein the forecasting module calculates the forecasted demand levels using at least one of the following: (a) an exponential smoothing algorithm, (b) a moving average algorithm, (c) a Holt-Winters algorithm, (d) a multiple linear regression algorithm.

42. The system of claim 33, wherein the forecasting module, the anomaly detection module, and the reporting module run on a single, general purpose computer.

43. The system of claim 33, wherein each time period has a duration falling in the range of one minute to six hours.

44. The system of claim 33, wherein the reporting module generates alert messages that provide an option for recipients thereof to provide feedback reflective of whether the anomalies described in such messages were properly detected.

45. The system of claim 33, wherein the system detects said anomalies substantially in real time.

46. The system of claim 33, wherein the system detects said anomalies substantially in real time with a sustained order rate of over $10^3$ orders per minute and a catalog size of over $10^8$ items.

47. The system of claim 33, wherein each of said time periods has a duration of no more than three hours.

48. The system of claim 37, wherein the problem space reduction module uses at least order quantity information and item price information to select the subset of items.

49. The system of claim 37, wherein the problem space reduction module selects the subset of items such that the anomaly detection module detects said anomalies prior to fulfillment of corresponding orders.

50. The system of claim 37, wherein the problem space reduction module selects the subset of items such that the anomaly detection module detects the anomalies substantially in real time.

51. A system for detecting anomalous user activity associated with items in a catalog, comprising:
a data repository that stores aggregated data descriptive of orders placed by users from a catalog of items, said aggregated data arranged by time period;
a forecasting module that analyzes item demand levels in prior time periods on an item-by-item basis, as indicated by the aggregated data, to predict demand levels for respective items in a current time period;
an anomaly detection module that detects anomalies associated with specific items in the catalog at least by comparing the demand levels predicted by the forecasting module to corresponding observed demand levels;
a reporting module that generates alert messages to notify catalog administrators of items for which anomalies are detected by the anomaly detection module; and
computer hardware that executes the forecasting module, the anomaly detection module, and the reporting module, the computer hardware comprising one or more computers,
wherein the reporting module generates alert messages that include hyperlinks to electronic catalog pages of associated items, to facilitate determinations of whether the detected anomalies are attributable to errors in the catalog.

52. A computer-implemented method of detecting anomalous user activity associated with use of an electronic catalog, the method comprising:
selecting an item ordered from an electronic catalog of items by a plurality of users;
determining, via execution of instructions by a machine that comprises one or more computing devices, whether an anomaly exists in user activity data associated with the item at least by comparing an actual demand for the item in a current time period to an expected demand that is based on observed demand levels for the item in prior time periods; and
in response to determining that an anomaly exists, generating an alert message that identifies the item and provides a link for accessing a catalog description of the item, to thereby assist a human operator in determining whether the anomaly is a result of an erroneous description of the item in the electronic catalog;
wherein the alert message is generated prior to fulfillment of orders placed for the item during the current time period.

53. The method of claim 52, wherein the current time period has a duration falling in the range of one minute to six hours.

54. The method of claim 53, wherein the alert message is generated within one hour of an end of the current time period.

55. The method of claim 53, wherein determining whether an anomaly exists comprises using a forecasting algorithm to calculate said expected demand.

56. The method of claim 53, wherein determining whether an anomaly exists comprises taking into consideration feedback provided by human operators in response to prior anomaly alert messages.

57. The method of claim 52, wherein the step of determining whether an anomaly exists is performed substantially in real time.

58. The method of claim 52, wherein each of said time periods has a duration of no more than three hours.

59. The method of claim 52, wherein the method in its entirety is performed automatically by a computer system that comprises one or more computing devices.

60. The method of claim 52, further comprising, in response to the alert message, assessing whether the anomaly is a result of an erroneous description of the item in the electronic catalog.

* * * * *

UNITED STATES PATENT AND TRADEMARK OFFICE
CERTIFICATE OF CORRECTION

PATENT NO.       : 7,574,382 B1                                           Page 1 of 1
APPLICATION NO.  : 10/910457
DATED            : August 11, 2009
INVENTOR(S)      : Zachary T. Hubert It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 708 days.

Signed and Sealed this

Seventh Day of September, 2010

David J. Kappos
*Director of the United States Patent and Trademark Office*